United States Patent Office 2,966,502
Patented Dec. 27, 1960

2,966,502
PENTAHYDROXYSTEROID AND ITS ESTERS

Hayao Nawa, Amagasaki, and Masamoto Nishikawa, Nishinomiya, Japan, assignors to Takeda Pharmaceutical Industries, Ltd., Osaka, Japan No Drawing. Filed Feb. 17, 1960, Ser. No. 9,173
Claims priority, application Japan Feb. 24, 1959
6 Claims. (Cl. 260—397.5)

The present invention relates to a new steroid compound which is characterized by its anti-mineralo-corticoid and by its diuretic activities, and also to esters of such compound. More concretely, the invention has specific relation to pregnane-3β, 5α, 6β, 16β, 20α-pentol and its esters, and to the preparation of these compounds. (A mineralo-corticoid is one which is especially effective in causing the retention of sodium and the loss of potassium. An anti-mineralo-corticoid is one which has the reverse action and causes the loss of sodium and the retention of potassium.)

In recent years, a number of adrenal cortical hormones, such as hydrocortisone and cortisone, have been used in the therapy of arthritis, rheumatism and so on. Although these hormones are essentially of the glucocorticoid type—a glucocorticoid being one which increases gluconeogenesis, raising the concentration of liver glycogen and blood sugar—they also have mineralo-corticoid activity, so that they are sometimes able to exert undesirable influences upon water-balance and mineral metabolism in the living animal organism, e.g. in the human body. Consequently, when these hormones are clinically applied to the therapy of a human disease, undesirable side effects such as anasarca (dropsy), a rise of blood pressure and cardiac insufficiency may occur; these side effects have been unavoidable barriers to the effective clinical application of these hormones.

More recently, several substances such as prednisolone and its homologous compounds which have higher glucocorticoid activity, have been synthesized. The mineralo-corticoid activity of these newly-synthesized compounds is lower than that of the adrenal cortical hormones.

However, there is still a need in the art for a therapeutic agent of the indicated general type but which has no mineralo-corticoid activity, such need not having been satisfied by the recently-synthesized compounds of the prior art.

A primary object of the present invention is to satisfy the aforesaid need.

This, briefly stated, has been accomplished by the embodiment of the aforesaid new pentahydroxypregnane—pregnane-3β, 5α, 6β, 16β, 20α-pentol—and its esters. It has been found, quite unexpectedly and wholly unforeseeably, that the said pentol has a remarkable anti-mineralo-corticoid activity, i.e. that it brings about excretion of water and sodium ion from the animal organism, and more particularly, from the human body.

In view of the embodiment of the new pentol of the present invention, and of its enumerated properties, it has now become possible, by using adrenal cortical hormones or synthesized adrenocorticoid active substances together with such new pentol, to eliminate the undesirable side effects of the said hormones or the hormone-active substances and, therefore, to allow these hormones or hormone-active substances to act effectively only as glucocortocoids.

The new pregnane-3β, 5α, 6β, 16β, 20α-pentol is also useful by itself, in the living animal organism, and especially in the living human body, as a potent diuretic.

The esters of the said pentol, according to the present invention, have the anti-mineralo-corticoid activity of the pentol itself and, like the latter, are also useful as diuretics. They are further useful as intermediates in the preparation of the said pentol.

The new compounds of the present invention correspond to the formula

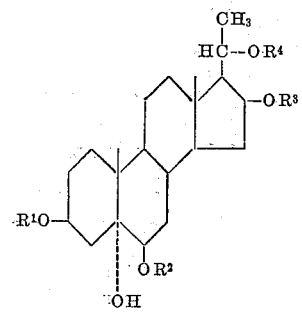

wherein each of $R^1$, $R^2$, $R^3$, and $R^4$ stands for hydrogen, formyl, lower alkylcarbonyl, lower alkoxycarbonyl or phenylcarbonyl, etc. Lower alkylcarbonyl groups are e.g. acetyl, propionyl, butyryl and the like; lower alkoxycarbonyl groups are e.g. methoxycarbonyl, ethoxycarbonyl, propoxycarbonyl, butoxycarbonyl, etc.

A further object of the invention is the development of procedure for preparing the aforesaid compounds of Formula I.

For the purpose of realizing the latter object, steroids such as 5(6)-pregnene-3β, 16β, 20α triol, 5(6)-spirosten-3β-ol, 5,6-epoxyspirostan-3β-ol, spirostan-3β, 5α, 6β-triol and their esters produced with carboxylic acids or monoalkyl carbonates are used as starting materials. Formic acid, acetic acid, propionic acid, benzoic acid, etc. are representative of the carboxylic acids thus employed, while the lower monoalkylcarbonates such as methyl carbonate, ethyl carbonate, etc. are representative of the monoalkoxy carbonates employed.

The objective compounds, pregnane-3β, 5α, 6β, 16β, 20α-pentol and its esters, are prepared by subjecting the starting steroids to one or more steps of oxidation reactions, and, if necessary, by subsequent hydrolysis of the resultant oxidized compounds.

The above oxidation can advantageously be brought about by allowing the starting steroid to react with an oxidizing agent such as hydrogen peroxide, persulfuric acid, performic acid, peracetic acid, etc. to give the objective compound directly. Periodic acid can also be used as an oxidizing agent for the above oxidation reaction, and is used more advantageously with starting steroids belonging to the pregnane series than with those belonging to the spirostan series, because, in the latter case, it is necessary supplementarily to employ a secondary oxidation with an oxidizing agent such as hydrogen peroxide, persulfuric acid, performic acid and peracetic acid in order to split off the side ring of the spirostane skeleton.

Hypohalogenic acids such as hypochloric acid and hypobromic acid can be used to oxidize a starting steroid having a double bond between the 5 and 6 positions into the corresponding 5-halo-6β-hydroxy compound, which can then be converted into the objective compound; for example, the halohydrine is treated with an alkali to produce a 5,6-epoxy compound and the latter is hydrolyzed with an acid to give the corresponding 5α, 6β-glycol compound, so that this reagent (hypohalogenic acid) can also be used for the oxidation in the present invention as an oxidizing agent more advantageously with 5(6)-pregnene-3β,16β,20α-triol or its esters.

An oxidizing agent such as perbenzoic acid and pernaphthoic acid can be used to oxidize a starting steroid having a double bond between the 5 and 6 positions into the corresponding 5,6-epoxide or its ester. The epoxide can then be hydrolyzed with an acid in the same way as mentioned in the preceding paragraph, so that these reagents (perbenzoic acid, pernaphthoic acid) are also usable for the oxidation of 5(6)-pregnene-3β,16β,-20α-triol or its esters.

A solvent, in addition to the solvent for the oxidizing agent, such as formic acid, chloroform, ether, benzene or dioxane, is advantageously used in order to make the reactions proceed smoothly. The reactions are accelerated by heating.

When use is made, in the said said oxidation reactions, of a per-organic acid as an oxidizing agent and/or a solvent which are capable of esterifying a free hydroxy group, any free hydroxyl group or groups present in the starting steroids and the oxidation products may be esterfied during the reaction. When such an esterfied product is obtained, it may easily be saponified with an acid or an alkali to liberate free hydroxyl group or groups.

The following examples set forth, solely by way of example, presently preferred illustrative embodiments of the invention. In these examples the relationship between parts by weight and parts by volume is the same as that between grams and milliliters. Percentages are percentages by weight; temperatures are in degrees centigrade.

Example 1

A suspension of 10 parts by weight of diosgenin in a mixture of 200 parts by volume of 85% formic acid and 20 parts by volume of 30% hydrogen peroxide is warmed on a water bath. A reaction takes place and the suspended diosgenin goes into solution. The reaction mixture is kept at 70–80° for one hour, and the formic acid is distilled off under reduced pressure until the volume of the mixture decreases to about half. To the residual mixture, water is added, whereupon crystals precipitate. The crystals, the tetraformate of pregnane-3β,5α,6β,16β,20α-pentol, are collected by filtration.

The crystals are dissolved in 50 parts by volume of methanol. To the solution, 30 parts by volume of 5% aqueous solution of sodium hydroxide are added, and the mixture is allowed to stand overnight at room temperature (about 20° to about 30°) to cause saponification. The reaction mixture is neutralized with acetic acid and the methanol is distilled off under reduced pressure. The residue is washed with water, and then dried to give 6.5 parts by weight of crude crystals of pregnane-3β,5α,-6β,16β,20α-pentol melting at 245–250°. Upon recrystallization from methanol-water, they melt at 250–252° C.

*Analysis.*—Calcd. for $C_{21}H_{36}O_5$: C, 68.82; H, 9.35. Found: C, 68.51; H, 9.72.

The product is acetylated with acetic anhydride in pyridine to form its tetracetate melting at 216–218°.

*Analysis.*—Calcd. for $C_{29}H_{44}O_9$: C, 64.90; H, 8.26. Found: C, 65.13; H, 8.19.

Example 2

To 5 parts by weight of 25D-spirostane-3β,5α,6β-triol [prepared according to Tsukamoto, Ueno and Ohta: Journal of the Pharmaceutical Society of Japan vol. 57, p. 988 (1937)], 50 parts by volume of 85% formic acid and 5 parts by volume of 35% hydrogen peroxide are added and the mixture is heated on a water-bath for 1.5 hours. Thereafter, the same treatment as in Example 1 is carried out on the reaction mixture to give 3 parts by weight of pregnane-3β,5α,6β,16β,20α-pentol.

Example 3

A suspension of 10 parts by weight of 5-pregnene-3β,16β,20α-triol [prepared by reducing 5-pregnene-3β,16β-diol-20-one or 5-pregnene-3β,16β-diol-20-one 16-(γ-methyl-δ-acetoxy)-valerate to change the 20-keto group into the 20α-hydroxymethylene group] in a mixture of 200 parts by volume of 85% formic acid and 20 parts by volume of 30% hydrogen peroxide is warmed on a water-bath, whereupon the crystals dissolve exothermically and a reaction takes place. After the reaction is effected for 1 hour at 70–80°, the formic acid is distilled off under reduced pressure to decrease the volume of the reaction mixture to half and then water is added to the residual solution to precipitate crude crystals, which are gathered by filtration. The product is the tetraformate of pregnane-3β,5α,6β,16β,20α-pentol.

The crude product is dissolved in 50 parts by volume of methanol and 30 parts by volume of 5% aqueous sodium hydroxide solution is added to the methanol solution, and then the mixture is allowed to stand overnight at room temperature to saponify the tetraformate.

The reaction mixture is neutralized with acetic acid, and the methanol is distilled off under pressure. Crystals precipitated are gathered by means of filtration and recrystallized from methanol-water to give 8 parts by weight of pregnane-3β,5α,6β,16β,20α-pentol melting at 250–252°.

Having thus disclosed the invention, what is claimed is:

1. Pregnane-3β,5α,6β,16β,20α-pentol.
2. A tetra-ester of the formula

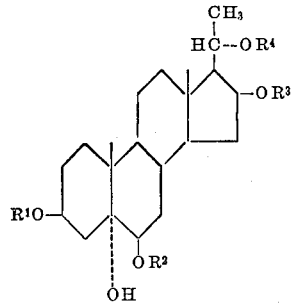

wherein each of $R^1$, $R^2$, $R^3$ and $R^4$ is lower alkylcarbonyl.

3. A tetra-ester of the formula

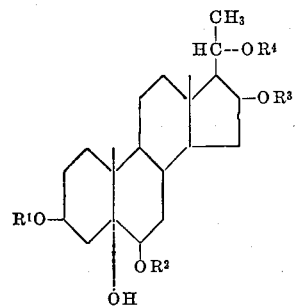

wherein each of $R^1$, $R^2$, $R^3$ and $R^4$ is lower alkoxycarbonyl.

4. A tetra-ester of the formula

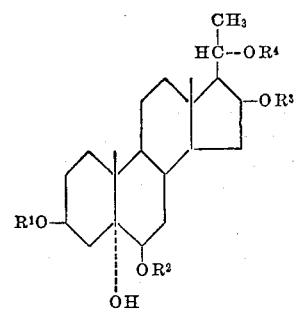

wherein each of $R^1$, $R^2$, $R^3$ and $R^4$ is phenylcarbonyl.

5. Pregnane - 3β,5α,6β,16β,20α - pentol 3β,6β,16β,20α-formate.

6. Pregnane-3β,5α,6β,16β,20α - pentol 3β,6β,16β,20α-tetracetate.

No references cited.

UNITED STATES PATENT OFFICE
CERTIFICATE OF CORRECTION

Patent No. 2,966,502                         December 27, 1960

Hayao Nawa et al.

It is hereby certified that error appears in the above numbered patent requiring correction and that the said Letters Patent should read as corrected below.

Column 3, line 12, strike out "said", second occurrence; column 4, line 15, for "under pressure" read -- under reduced pressure --; line 71, for "formate" read -- tetraformate --.

Signed and sealed this 3rd day of October 1961.

(SEAL)
Attest:

ERNEST W. SWIDER
Attesting Officer

DAVID L. LADD
Commissioner of Patents
USCOMM-DC